(12) United States Patent
Fleming, III

(10) Patent No.: US 6,530,018 B2
(45) Date of Patent: *Mar. 4, 2003

(54) APPARATUS FOR AUTOMATICALLY RETRIEVING AND INSTALLING DEVICE DRIVERS ACROSS A NETWORK

(75) Inventor: Hoyt A. Fleming, III, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 10/185,514

(22) Filed: Jun. 28, 2002

(65) Prior Publication Data

US 2002/0166045 A1 Nov. 7, 2002

Related U.S. Application Data

(63) Continuation of application No. 09/415,028, filed on Oct. 7, 1999, now Pat. No. 6,442,683.

(51) Int. Cl.[7] .............................................. G06F 9/445
(52) U.S. Cl. ....................................................... 713/1
(58) Field of Search ............................... 713/1, 2, 100; 709/220–222

(56) References Cited

U.S. PATENT DOCUMENTS

| | | | |
|---|---|---|---|
| 4,589,063 A | 5/1986 | Shah et al. ................. | 364/200 |
| 5,128,995 A | 7/1992 | Arnold et al. ................. | 380/4 |
| 5,418,918 A | 5/1995 | Vander Kamp et al. ..... | 395/375 |
| 5,463,766 A | 10/1995 | Schieve et al. ............. | 395/650 |
| 5,581,766 A | 12/1996 | Spurlock ..................... | 395/652 |
| 5,598,563 A | 1/1997 | Spies ........................... | 395/652 |
| 5,598,577 A | 1/1997 | Overfield .................... | 395/830 |
| 5,630,076 A | 5/1997 | Saulpaugh et al. ......... | 395/284 |
| 5,655,148 A | 8/1997 | Richman et al. ............ | 395/828 |
| 5,668,992 A | 9/1997 | Hammer et al. ............ | 395/651 |
| 5,675,831 A | 10/1997 | Caputo ........................ | 395/830 |
| 5,701,476 A | 12/1997 | Fenger ........................ | 395/652 |
| 5,715,463 A | 2/1998 | Merkin ........................ | 395/712 |
| 5,732,282 A | 3/1998 | Provino et al. ............. | 395/830 |
| 5,794,032 A | 8/1998 | Leyda ......................... | 395/652 |

Primary Examiner—Thomas M. Heckler
(74) Attorney, Agent, or Firm—Park, Vaughan & Fleming LLP

(57) ABSTRACT

One embodiment of the present invention provides a system that retrieves and installs device driver software across a network. The system includes a detection mechanism that detects the presence of a device in a computer system for which no current driver is installed in the computer system. The system also includes a reading mechanism that reads a locator specifying the location of a current driver for the device from a non-volatile memory on the device. The system additionally includes a driver retrieving mechanism that uses the locator to communicate with a remote host across the network in order to retrieve the current driver for the device from the remote host. The system also includes an installation mechanism that installs the current driver on the computer system.

21 Claims, 2 Drawing Sheets

APPARATUS FOR AUTOMATICALLY RETRIEVING AND INSTALLING DEVICE DRIVERS ACROSS A NETWORK

RELATED APPLICATION

This application is a continuation of U.S. patent application Ser. No. 09/415,028, filed Oct.7, 1999, now U.S Pat. No. 6,442,683. This application hereby claims priority under 35 U.S.C. § 120 to the above-listed application. The subject matter of this application is also related to the subject matter in a co-pending non-provisional application by the same inventor as the instant application entitled, "Method for Automatically Retrieving and Installing Device Drivers Across a Network," having Ser. No. 09/415,029, and filing date Oct. 7, 1999 (Attorney Docket No. M99-256001).

BACKGROUND

1. Field of the Invention

The present invention relates to software drivers for devices within a computer system. More specifically, the present invention relates to a method and an apparatus for automatically retrieving and installing software device drivers across a network.

2. Related Art

When a computer user installs a device, such as a video card, into a computer system, the installation process typically involves physically inserting the device into the computer system, and then installing appropriate driver software. This driver software is either retrieved from a driver library in the operating system or is alternatively loaded from a disk that is shipped with the device.

Providing driver software in either of these ways has disadvantages. First, the process of installing the driver software must be performed manually, typically by loading the driver software into the computer system from the disk, or by manually selecting the driver software from the driver library within the operating system. This manual installation process is time-consuming and it can present challenges for a novice computer user who is not familiar with the software installation process. In fact, the process of installing the driver software can take as long or longer than the process of physically installing the device into the computer system. Additionally, different versions of driver software may have to be provided for different operating systems and/or different computer systems. This often requires a manufacturer to ship a device with multiple versions of the driver software.

Another disadvantage is that driver software is typically out-dated by the time it is installed. The driver library in the operating system is the same age as the operating system. Hence, driver software from the driver library can potentially be many years old. Furthermore, if the device is new, a corresponding driver will not exist in the operating system's driver library.

Even driver software shipped with a device can be out-dated. This is because the device and associated driver software can potentially sit on a store shelf or in the distribution chain for many months before being purchased. Another problem is that shipping driver software along with a device incurs additional cost. The cost of shipping the driver software can account for a significant fraction of the total cost for certain low cost devices, such as internal modems or scanners.

What is needed is a system that automatically retrieves and installs a current device driver when a corresponding device is installed in a computer system.

SUMMARY

One embodiment of the present invention provides a system that retrieves and installs device driver software across a network. The system includes a detection mechanism that detects the presence of a device in a computer system for which no current driver is installed in the computer system. The system also includes a reading mechanism that reads a locator specifying the location of a current driver for the device from a non-volatile memory on the device. The system additionally includes a driver retrieving mechanism that uses the locator to communicate with a remote host across the network in order to retrieve the current driver for the device from the remote host. The system also includes an installation mechanism that installs the current driver on the computer system.

In one embodiment of the present invention, the locator includes a universal resource locator (URL) and the network includes the Internet. In another embodiment, the locator includes a telephone number and the network includes a telephone network.

In one embodiment of the present invention, the detection mechanism is configured to detect the presence of the device during a boot cycle following a power up of the computer system.

In one embodiment of the present invention, the installation mechanism is configured to install the current driver following a boot cycle of the computer system.

In one embodiment of the present invention, the installation mechanism is configured to reboot the computer system after installing the current driver.

One embodiment of the present invention includes a default driver for the device that is used by the computer system to operate the device in a restricted performance mode until the current driver is installed.

In one embodiment of the present invention, the detection mechanism is configured to detect the presence of an out-of-date driver for the device in the computer system. In this embodiment, the installation mechanism is configured to install an updated driver for the device. In a variation on this embodiment, the installation mechanism is configured to produce the updated driver by applying an update to the out-of-date driver.

In one embodiment of the present invention, the driver retrieving mechanism is configured to send an identifier for the computer system to the remote host so that the remote host can return a version of the current driver that is tailored to the computer system.

One embodiment of the present invention provides a device that facilitates retrieval and installation of a driver for the device across a network. The device includes a module with an interface that is configured so that it can be inserted into a computer system. A non-volatile memory is located within the module, and a locator is encoded in the non-volatile memory. This locator specifies a location on the network for a current driver for the device so that the computer system can use the locator to retrieve the current driver. This allows the current driver to be automatically installed in the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
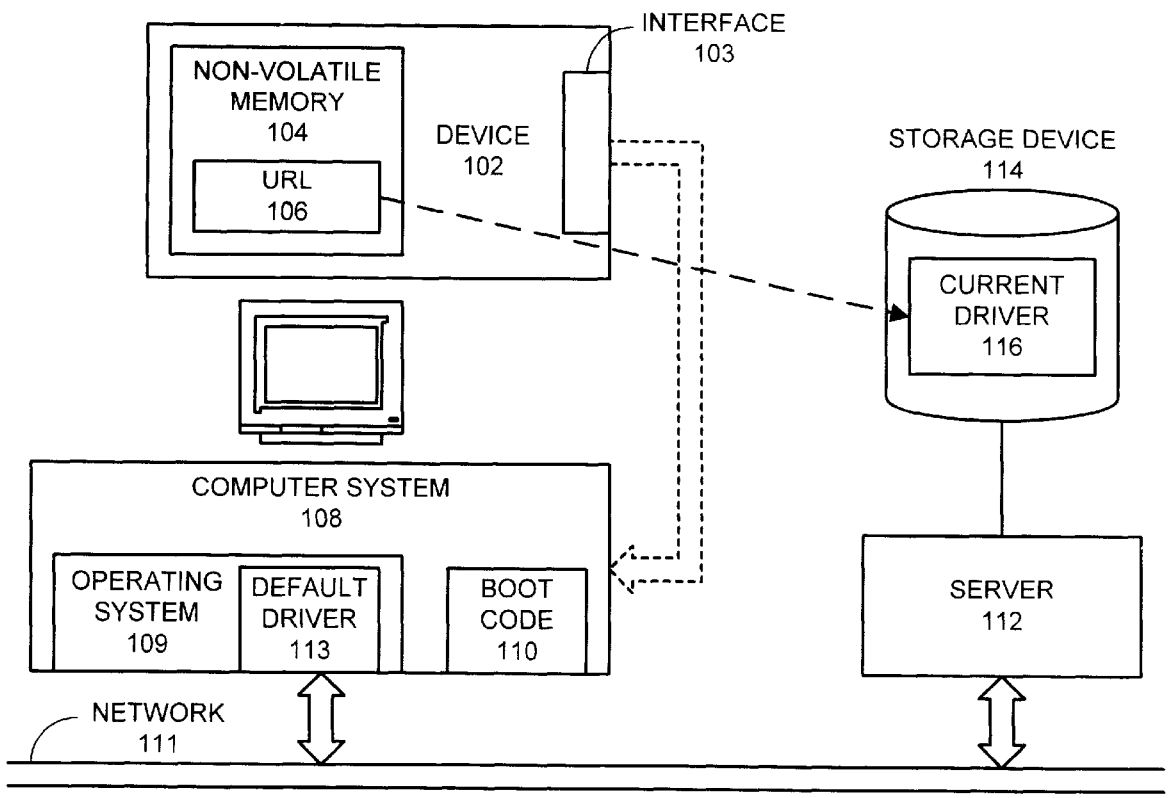
FIG. 1 illustrates a computer system that is coupled to a server across a network in accordance with an embodiment of the present invention.

FIG. 1 illustrates a computer system 108 that is coupled to a server 112 across a network 111 in accordance with an embodiment of the present invention. In this embodiment, computer system 108 can include any type of computer system built around a general purpose or special purpose processor, including, but not limited to, a microprocessor, a mainframe computer, a digital signal processor, a personal organizer and a device controller. Computer system 108 includes operating system 109, which controls the operation of computer system 108.

In one embodiment of the present invention, operating system 109 includes default driver 113. Default driver 113 can act as a driver for device 102 in a restricted performance mode until a current driver 116 is installed.

Computer system 108 also includes boot code 110 that performs system initialization operations for computer system 108. In one embodiment of the present invention, boot code 110 is stored within a read only memory in computer system 108.

Server 112 can include any node on network 111 that includes computational and data storage resources, as well as a mechanism for servicing requests for the computational and/or data storage resources. More specifically, server 112 is coupled to storage device 114. Storage device 114 can include any type of device for storing code and/or data. This includes, but is not limited to, magnetic, optical and magneto-optical storage devices, as well as semiconductor-based storage devices, such as flash memory.

Storage device 114 contains current driver 116. In one embodiment of the present invention, current driver 116 includes code that comprises the most recently implemented driver for device 102. In another embodiment, current driver 116 includes the most recent update for a driver for device 102.

Network 111 generally refers to any type of wire or wireless link between computers, including, but not limited to, a telephone network, a local area network, a wide area network, or a combination of networks. In one embodiment of the present invention, network 111 includes the Internet. In another embodiment, network 111 includes multiple networks, including a local area network and the Internet.

Device 102 can include any type of component or peripheral device that can be plugged into computer system 108. This includes, but is not limited to, a video card (or graphics controller), a data acquisition card, a sound card, a scanner, a printer, a keyboard, a data storage device, an interface to a personal organizer, a keyboard, a sound card, a modem, a network interface controller (NIC) and a display device. In general, device 102 can include any type of device that has associated device driver software.

Device 102 contains an interface 103 as well as a non-volatile memory 104. Interface 103 can include any type of interface for coupling device 102 into computer system 108. Non-volatile memory 104 can include any type of non-volatile memory that can hold data when computer system 108 is powered down. This includes, but is not limited to, magnetic storage, flash memory, ROM, EPROM, EEPROM, and battery-backed-up RAM. Non-volatile memory 104 contains universal resource locator (URL) 106. URL 106 includes any type of locator or address that can be used to locate and retrieve current driver 116 across network 111.

In one embodiment of the present invention, URL 106 specifies an Internet location for current driver 116 and network 111 includes the Internet. This allows current driver 116 to be accessed by any user of the Internet.

In another embodiment, URL 106 includes a telephone number and network 111 includes a telephone network. In this embodiment, computer system 108 directly dials into server 112 to retrieve current driver 116.

During operation, the system illustrated in FIG. 1 operates generally as follows. Device 102 is inserted into computer system 108. Upon detecting device 102, computer system 108 reads URL 106 from non-volatile memory 104 within device 102 and uses URL 106 to retrieve current driver 116 from server 112 across network 111. Current driver 116 is then automatically installed within computer system 108, thereby allowing device 102 to operate properly.

Facilitating Retrieval and Installation of a Device Driver

Figure 2:
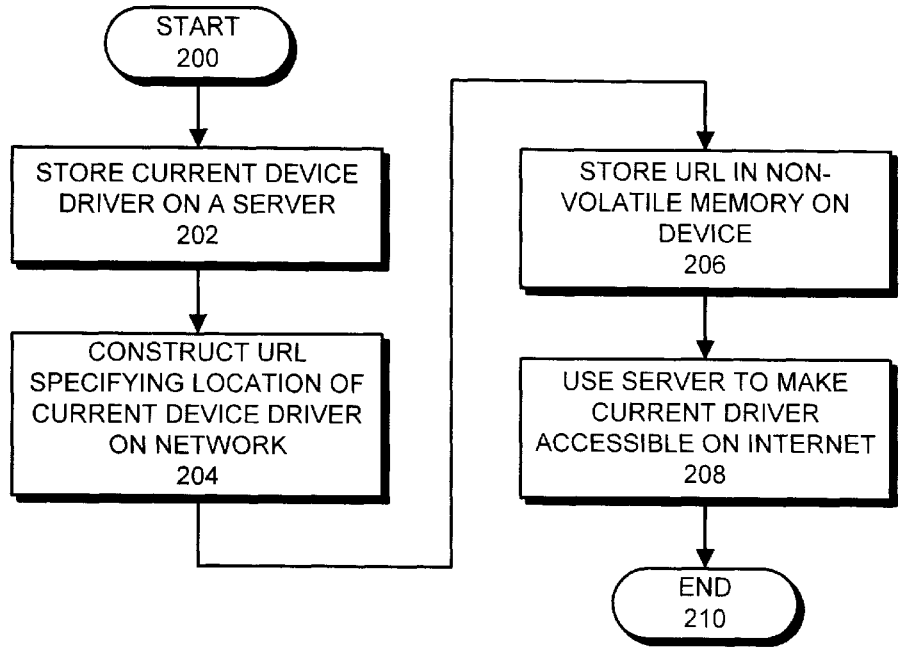
FIG. 2 is a flow chart illustrating the process of facilitating retrieval and installation of a driver for a device across a network in accordance with an embodiment of the present invention.

FIG. 2 is a flow chart illustrating the process of facilitating retrieval and installation of a driver for device 102 across network 111 in accordance with an embodiment of the present invention. The system starts by storing current driver 116 within storage device 114 that is coupled to server 112. The system also creates an URL 106 specifying the location of current driver 116 on network 111 (step 204). URL 106 is then stored in non-volatile memory 104 within device 102 (step 206). Next, server 112 makes current driver 116 accessible at a location specified by URL 106 on network 111 (step 208). This allows current driver 116 to be retrieved by a requester across network 111.

Process of Retrieving and Installing a Device Driver

Figure 3:
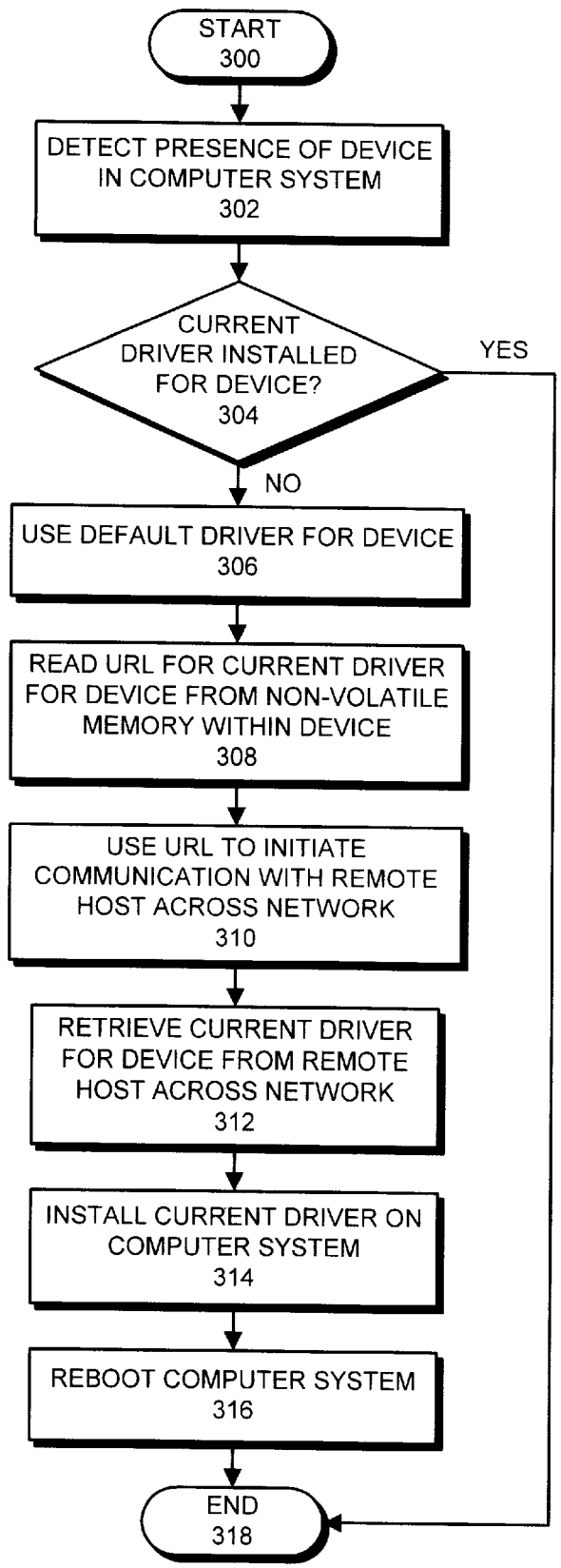
FIG. 3 is a flow chart illustrating the process of retrieving and installing a device driver across a network in accordance with an embodiment of the present invention.

FIG. 3 is a flow chart illustrating the process of retrieving and installing current driver 116 across network 111 in accordance with an embodiment of the present invention. In this embodiment, the system starts by detecting the presence of device 102 within computer system 108 (step 302). In one embodiment of the present, this detection can take place during a system boot operation after the system is powered on. Next, the system determines whether a current driver is installed for device 102 (step 304). In one embodiment of the present invention, this entails determining if any driver is installed for device 102. In another embodiment, this entails determining if a driver that is presently installed for device 102 is out-of-date, for example by checking an expiration date for the driver. If current driver 116 is already installed in the computer system, the system proceeds to the end of the process.

Otherwise, current driver 116 must be installed. In one embodiment of the present invention, default driver 113 is used until current driver 116 can be installed (step 306). This allows computer system 108 to function in a restricted performance mode until current driver 116 is installed. Note that if device 102 is a device that must be used during the retrieval process, such as a network interface controller, it may not be possible to perform the retrieval without default driver 113. Other devices, such as a sound card, are not necessary for the retrieval process. For these devices, it is possible to perform the retrieval process without default driver 113.

The system next retrieves current driver 116 by reading URL 106 from non-volatile memory 104 within device 102 (step 308). URL 106 is used to initiate communication with a remote host (server 112) across network 111 (step 310). Next, the system retrieves current driver 116 from server 112 across network 111 (step 312). In one embodiment of the present invention, retrieving current driver 116 entails sending an identifier for computer system 108 to server 112 so that the server 112 can return a version of current driver 116 that is tailored to computer system 108.

Current driver 116 is then installed on computer system 108 (step 314). In one embodiment of the present invention this installation process involves installing a new current driver 116 within computer system 108. In another embodiment, current driver 116 is in the form of an update, and the installation process entails applying the update to an old version of the driver to produce an updated driver, and then installing the updated driver. Next, computer system 108 is rebooted if necessary (step 316).

In one embodiment of the present invention, the entire process outlined above takes place during a system boot operation following a power on operation for the computer system. In this embodiment, the process is controlled by boot code 110 stored in a system BIOS in read-only memory (ROM) within computer system 108. In this embodiment, the step of detecting the presence of the device (step 302) takes place as part of the normal power on self test (POST) process within boot code 110. In this embodiment, the other steps 304–316 take place at the end of the system boot operation, after the POST process is complete.

In another embodiment of the present invention, the entire process outlined above takes place after the boot process is complete. In this embodiment, the process is controlled by operating system 109, which performs steps 302–316 as outlined above.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. An apparatus for retrieving and installing device driver software across a network, comprising:
   a detection mechanism that is configured to detect a presence of a device in a computer system for which no current driver is installed in the computer system;
   a reading mechanism that is configured to read a locator specifying a location of a current driver for the device from a non-volatile memory on the device;
   a driver retrieving mechanism that,
      is configured to communicate with a remote host across the network, and
      is further configured to retrieve the current driver for the device from the remote host across the network; and
   an installation mechanism that is configured to install the current driver for the device on the computer system.

2. The apparatus of claim 1, wherein the locator includes a universal resource locator (URL).

3. The apparatus of claim 1, wherein the network includes the Internet.

4. The apparatus of claim 1, wherein the locator includes a telephone number and the network includes a telephone network.

5. The apparatus of claim 1, wherein the installation mechanism is configured to reboot the computer system after installing the current driver.

6. The apparatus of claim 1, wherein the detection mechanism is configured to detect the presence of the device during a boot cycle following a power up of the computer system.

7. The apparatus of claim 1, wherein the installation mechanism is configured to install the current driver following a boot cycle of the computer system.

8. The apparatus of claim 1, further comprising a default driver for the device that is configured to operate the device in a restricted performance mode until the current driver is installed.

9. The apparatus of claim 1, wherein the driver retrieving mechanism is configured to send an identifier for the computer system to the remote host so that the remote host can return a version of the current driver that is tailored to the computer system.

10. The apparatus of claim 1,
   wherein the detection mechanism is configured to detect the presence of an out-of-date driver for the device in the computer system; and
   wherein the installation mechanism is configured to install an updated driver for the device.

11. The apparatus of claim 10, wherein the installation mechanism is configured to create the updated driver by applying an update to the out-of-date driver.

12. A computer system that facilitates retrieving and installing device driver software across a network, comprising:
   a processor;
   a memory;
   a detection mechanism that is configured to detect a presence of a device in the computer system for which no current driver is installed in the computer system;
   a reading mechanism that is configured to read a locator specifying a location of a current driver for the device from a non-volatile memory on the device
   a driver retrieving mechanism that,
      is configured to communicate with a remote host across the network, and
      is further configured to retreive the current driver for the device from the remote host across the network; and
   an installation mechanism that is configured to install the current driver for the device on the computer system.

13. An apparatus that facilitates retrieving and installing device driver software across a network, comprising:
   an operating system that is configured to control the operation of a computer system;

a reading mechanism within the operating system that is configured to read a locator specifying a location of a current driver for a device within the computer system from a non-volatile memory on the device;

a driver retrieving mechanism within the operating system that,
is configured to communicate with a remote host across the network, and
is further configured to retreive the current driver for the device from the remote host across the network; and an installation mechanism within the operating system that is configured to install the current driver for the device on the computer system.

14. The apparatus of claim 13, wherein the locator includes a universal resource locator (URL).

15. The apparatus of claim 13, wherein the network includes the Internet.

16. The apparatus of claim 13, further comprising a detection mechanism that is configured to detect a presence of the device in the computer system for which no current driver is installed in the computer system.

17. The apparatus of claim 16, wherein the detection mechanism is further configured to detect the presence of an out-of-date driver for the device in the computer system; and wherein the installation mechanism is further configured to install an updated driver for the device.

18. A device that facilitates retrieval and installation of a driver for the device across a network, comprising:

an interface that is configured to couple the device to a computer system;

a non-volatile memory; and a locator encoded in the non-volatile memory that is configured to specify a location on the network for a current driver for the device.

19. The device of claim 18, wherein the locator is encoded in the non-volatile memory in a form that allows the computer system to read the locator from the non-volatile memory, which enables the computer system to use the locator to retrieve the current driver for the device thereby allowing the current driver to be installed in the computer system.

20. The device of claim 18, wherein the locator includes a universal resource locator (URL).

21. The device of claim 18, wherein the network includes the Internet.

* * * * *